United States Patent [19]

McDonald

[11] 4,391,422
[45] Jul. 5, 1983

[54] WEIGHT BALANCED SPOOL CARRIER

[76] Inventor: Colin McDonald, 20241 SE. 232 St., Maple Valley, Wash. 98038

[21] Appl. No.: 251,257

[22] Filed: Apr. 6, 1981

[51] Int. Cl.³ .................... B65H 49/00; B65H 17/46
[52] U.S. Cl. ............................ 242/129.6; 242/86.5 R
[58] Field of Search ............... 242/86.2, 86.5 R, 86.7, 242/99, 129, 129.6, 134; 280/242 R, DIG. 6

[56] References Cited

U.S. PATENT DOCUMENTS

| | | |
|---|---|---|
| 422,262 | 2/1890 | Stringer . |
| 1,214,772 | 2/1917 | Fouts . |
| 2,705,114 | 3/1955 | Worsham . |
| 3,134,555 | 5/1964 | Baker .................................. 242/86.5 |
| 3,831,877 | 8/1974 | Bennett et al. ................. 242/86.5 R |
| 3,856,230 | 12/1974 | Zimmer .......................... 242/86.5 R |
| 3,937,414 | 2/1976 | Bank et al. ..................... 242/86.5 R |
| 4,006,865 | 2/1977 | Howard .......................... 242/86.5 R |

*Primary Examiner*—Leonard D. Christian

[57] ABSTRACT

Four reels (R1, R2, R3, R4) of wire are supported for rotation about parallel support shafts (62, 64, 66, 68) which are spaced apart longitudinally of a main frame (12). The carrier (10) has a first dispense position (FIG. 6) in which a first end (1) of the main frame (12) makes contact with the ground and such main frame (12) slopes upwardly from such end to the second end of the main frame (12). When in its first dispense position the carrier (10) is supported by the first end (1) of the frame (12) and wheels (54, 56) carried at the lower end of a wheel support frame (16) which extends downwardly from an intermediate portion of the main frame (12). The carrier (10) has a second dispense position (FIG. 7) in which it is supported on and by the wheels (54, 56) and the lower end (2) of a support stand frame (14) which depends downwardly from the second end of the main frame (12). The main frame (12) slopes downwardly from its first end to its second end when it is in the second dispense position and the center of gravity CG of the loaded carrier (10) is located on the support stand side of the wheels (54, 56). The carrier (10) has a third or trundling position (FIG. 5) in which the center of gravity CG is substantially centered over the wheels (54, 56) and the loaded carrier (10) is substantially weight balanced on the wheels (54, 56).

14 Claims, 7 Drawing Figures

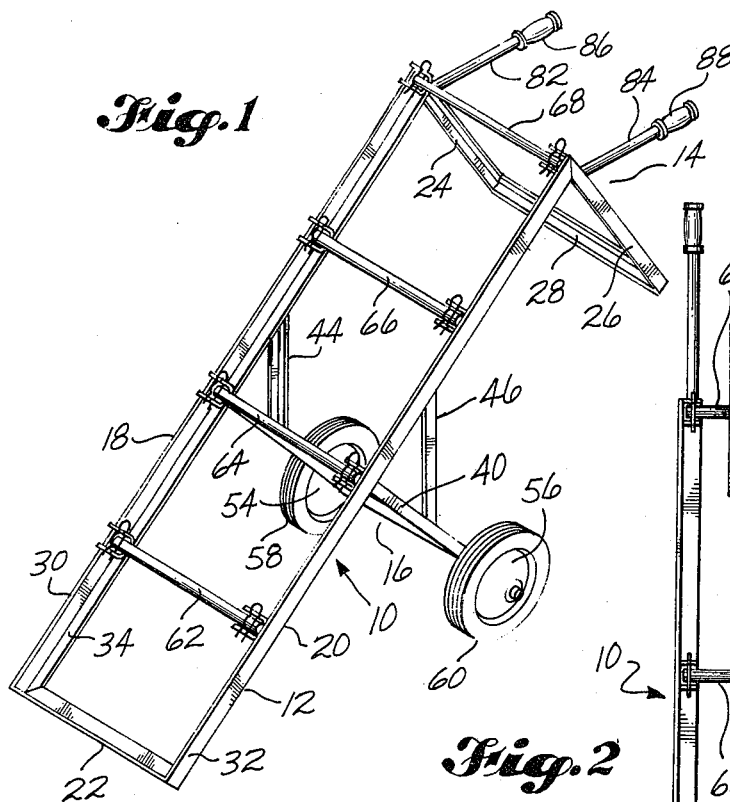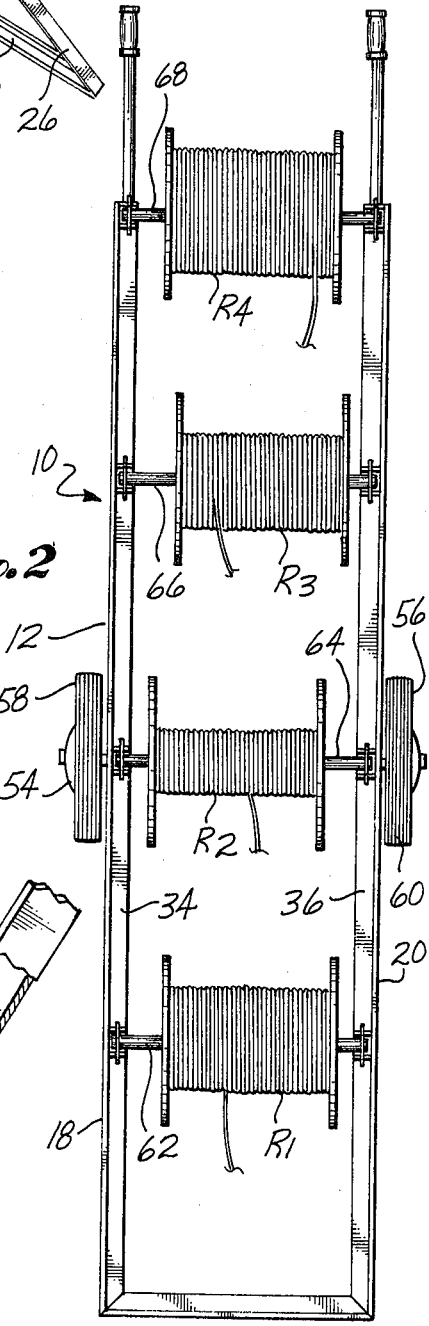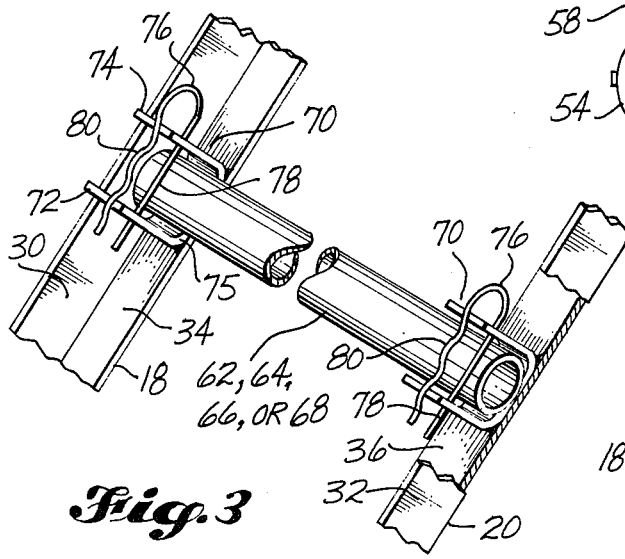

WEIGHT BALANCED SPOOL CARRIER

DESCRIPTION

1. Technical Field

The present invention relates to apparatus for transporting and dispensing wire or the like from spools, and more particularly to a spool carrier which has two different dispense positions and a weight balanced transport position.

2. Background Art

Wheeled wire carriers are disclosed by U.S. Pat. No. 2,705,114, granted Mar. 29, 1955, to Elmer L. Worsham; U.S. Pat. No. 3,134,555, granted May 26, 1964, to Gene W. Baker; U.S. Pat. No. 3,831,877, granted Aug. 27, 1974, to Joseph J. Bennett and Alvin A. Trapp and U.S. Pat. No. 3,856,230, granted Dec. 24, 1974, to Edward J. Zimmer.

A wire spool carrying cart in the form of a hand truck is marketed by Cobra Wire Leader Corporation of 4742 South Tennessee Place, Tucson, Arizona 85714, under the name WIRE CADDY. Such carrier is very similar to the carrier disclosed by the aforementioned U.S. Pat. No. 3,856,230, in that the operator must lift a substantial portion of the weight of the wire when he is transporting the wire from one location to another.

Other forms of wheeled wire carriers are sold by Greenlee Tool Co. of 2136 12th Street, Rockford, Ill. 61101 U.S.A., a unit of Ex-Cell-O Corp. The Greenlee No. 908 dispenser is in the form of a hand truck having handles at its upper end and a pair of forwardly projecting side bars at its lower end, positioned slightly above a pair of trundling wheels. The side bars are notched to receive the ends of a bar or shaft on which the wire reels are mounted. The Greenlee No. 909 dispenser comprises a frame mounted on three wheels, a single swivel wheel at the front and two spaced apart wheels at the back. The wire reels are mounted onto the frame in pairs at three different locations, i.e. six reels are carried. With this dispenser it is necessary to provide a guide on the frame through which the wires are fed. It is also necessary to provide a wheel lock so that the carrier will not move while wire is being paid out. The Greenlee 910 wire dispenser has a four wheel truck base, with a handle similar to a wagon handle. A frame projects upwardly from the base and supports a plurality of pairs of reels which are arranged in a circular pattern. Again, this dispenser requires a wheel lock and a wire guide.

The principal object of the present invention is to provide an improved wheeled wire spool carrier which possesses distinct advantage over all known forms of wheeled wire spool carriers.

U.S. Pat. No. 422,262, granted Feb. 25, 1980, to John H. Stringer, and U.S. Pat. No. 1,214,772, granted Feb. 6, 1917, to John A. Fouts each discloses a combined carrier and dispenser for barbed fence wire.

All of the above described patents, together with the prior art that was cited and considered by the Patent Office before granting them, and which is listed on the patents or described within the text of the patents, should be consulted for the purpose of properly evaluating the subject invention and putting it in its proper perspective relative to the prior art.

SUMMARY OF THE INVENTION

The carrier of the present invention is basically characterized by a construction which provides two dispensing positions and a weight balanced transport position.

The carrier basically comprises a main frame means having first and second ends. The first end of the main frame means presents a first ground contacting support. A support stand frame and a handle means are provided at the second or opposite end of the main frame means. The support stand frame extends downwardly from the main frame means to function as a stand at the second end. It presents at its lower end a second ground contacting support. A wheel supporting frame depends from a midportion of the main frame means and includes ground contacting wheels at its lower end. Journal means are provided on the main frame means for detachably securing the end of spool support shafts to the main frame means.

The carrier has a first dispense position wherein the first ground contacting support and the wheels contact the ground and the main frame means slopes upwardly from its first end to its second end. It also includes a second dispense position in which the second ground contacting support and the wheels contact the ground and the main frame means slopes downwardly from its first end to its second end.

The positioning of the journal means for the spool support shafts relative to the first and second ground contacting supports and the wheels is such that, when the carrier is loaded with spools and is in its first dispense position, the center of gravity of the carrier and spools is spaced towards the first end of the carrier from the location of contact of the ground supporting wheels with the ground. When the carrier is loaded with spools and is in its second dispense position the center of gravity of the carrier and spools is spaced towards the second end of the carrier from the location of contact of the ground contacting wheels with the ground. The positioning of the handle means relative to the journal means for the spool support shafts, to the wheels, and to the first and second ground contacting supports is such that, when an operator is standing substantially upright with his hands positioned downwardly and slightly in front of him and has the handles in his hands, the carrier is ground supported by the wheels alone and the center of gravity of the carrier and spools carried thereby is substantially over the wheels and the loaded carrier is substantially weight balanced on the wheels.

When the carrier is in its first dispense position the wire spools are positioned close enough together that the wire may be pulled from them together along a substantially horizontal path to a conduit without the necessity of using a guide. The wires leave the spools at a tangent and are positioned close enough to each other that they each have a substantially straight line path to the conduit. However, the arrangement and spacing of the spools is such that there is no interference by any of the wires with each other or with another spool.

When the carrier is in its second dispense position the reels are best positioned for dispensing a plurality of wires together in a substantially vertical direction.

The weight distribution of the wire carrying spools is such that the carrier is very stable and will not tip over. Also, no wheel lock is necessary. When the carrier is in its first dispense position the contact of its first ground contacting support with the ground serves to anchor the carrier against movement while the wires are being paid out. There is little tendency for the carrier to move while it is in its second dispense position because the wires are being paid out in a generally vertical direction. However, the contact of the second ground contacting support with the ground would act to resist movement of the cart during wire pay out when the cart is in its second dispense position.

According to one aspect of the invention, the main frame comprises a pair of spaced apart elongated side members, a cross member at the first end of such frame, connecting the two side members together, and a support stand frame at the second end, connecting the two side members together at such end. The journal means for at least one of the spool support shafts is spaced toward the first end of the main frame from the wheels and the journal means for at least one other of the spool support shafts is spaced from the wheels towards the second end of the main frame.

In preferred form, the carrier comprises journal means for four spool support shafts. The first journal means is spaced towards the first end of the main frame from the wheels, between the first end of the main frame and a connection of the wheel supporting frame with the main frame. The second journal means is positioned closely adjacent the connection of the wheel supporting frame with the main frame. The third journal means is positioned towards the second end of the main frame from the wheels, between the connection of the wheel supporting frame to the main frame and the second end of the main frame. The fourth journal means is positioned generally at the second end of the main frame.

According to another aspect of the invention, each journal means comprises an upwardly opening U-shaped saddle supported by a side portion of the main frame, and a removable cross pin means attachable to the saddle, to define therewith an enclosure for an end portion of a spool support shaft. In preferred use of such arrangement, the operator places a support shaft through aligned openings in end walls of a spool or reel of electrical wire or the like. He then picks the reel up under one arm and with his other hand he guides the forward end of the support shaft into the journal means located on the opposite side of the carrier from the operator, at which time the cross pin means for such journal means is in place. He then swings the near end of the spool support shaft downwardly into the U-shaped saddle of the journal means on his side of the carrier. He then inserts the removable cross pin means for such saddle, so that the spool support shaft is secured within both saddles.

In preferred form, each side member of the main frame is constructed from a length of angle iron having a first web which projects generally upwardly, or vertically, in spaced parallelism with the first web of the other side member. It also includes a second web which projects laterally inwardly from the first web in coplanar parallelism with the second web of the other side member. Preferably, each saddle rests on a second web and projects upwardly closely adjacent a said first web.

According to another aspect of the invention, the carrier comprises a wheel on each of its sides. Each wheel includes an elastomeric tire which is positioned outwardly of the side boundaries of both the wheel supporting frame and the main frame, so that the tire can function as a side bumper.

These and other objects, features and advantages of the invention are discussed below as a part of the description of a preferred embodiment, or are evident from the constructional makeup of the preferred embodiment.

BRIEF DESCRIPTION OF THE DRAWINGS

In the drawings, like element designations refer to like parts throughout, and:

FIG. 1 is a pictorial view taken from above and looking towards one end and one side of a wire spool carrier constructed in accordance with the present invention, with the wire spools omitted;

FIG. 2 is a top plan view of the carrier, showing spools of wire in place;

FIG. 3 is an enlarged scale fragmentary pictorial view showing a manner of detachably mounting the reel mounting members onto the main frame of the carrier;

BEST MODE FOR CARRYING OUT THE INVENTION

Figure 4:
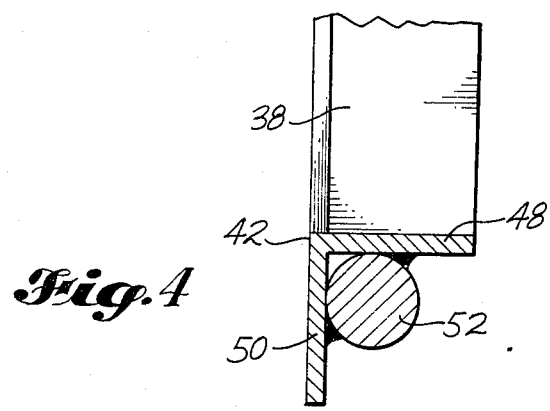
FIG. 4 is a fragmentary sectional view taken through a lower main frame member and a wheel shaft secured thereto.

Referring first to FIGS. 1 and 2, carrier 10 comprises a rectangular main frame 12, a support stand frame 14 and a wheel supporting frame 16.

Main frame 12 comprises a pair of side members 18, 20 which are preferably constructed from angle iron. A cross frame 22, provided at a first end of the main frame 12, connects the side members 18, 20 together at such end. The support stand frame 14 connects the opposite ends of the main frame together. Support stand frame 14 comprises a pair of side members 24, 26 and an interconnecting cross member 28. Preferably, members 22, 24, 26 and 28, are also constructed from angle iron.

Main frame side members 18, 20 are arranged so that the open side of the angle iron is directed upwardly. Accordingly, the first web 30 of side member 18 extends generally upwardly or vertically, in spaced parallelism with a first web 32 of side member 20. A second web 34 of side member 18 extends laterally inwardly towards and in coplaner parallelism with a second web 36 of side member 20.

As illustrated, bevel joints may be provided at the corners where the ends of cross member 22 intersect the ends of side members 18, 20, and the members may be welded together where they intersect. In similar fashion, bevel cuts may be made where the upper ends of frame members 24, 26 join the opposite ends of main frame side members 18, 20, and such members may be welded together where they meet. In similar fashion, although not shown, bevel cuts may be made where the ends of cross member 28 meet the lower ends of side members 24, 26, and such members may be welded together where they meet.

The wheel supporting frame 16 may comprise a pair of parallel vertical members, 38 (FIG. 4) 40, a lower cross member 42 (FIG. 4), and a pair of diagonal brace members 44, 46. Again, bevel cuts may be provided where the ends of cross member 42 meet the lower ends of vertical members 38, 40, and such members are welded together where they meet. The upper ends of vertical members 38, 40 and the diagonally cut ends of brace members 44, 46 are butt-welded to the frame members which they intersect.

As shown by FIG. 4, the lower cross member 42 is oriented to open downwardly, so that a first web 48 is substantially horizontally oriented and a second web 50 is substantially vertically oriented. A non-rotating support shaft or axle 52 is set into the inside corner defined by webs 48, 50 and is welded to webs 48, 50.

Axle 52 has end portions which project outwardly beyond the ends of cross member 42, to serve as mounts for a pair of wheels 54, 56. Wheels 54, 56 include elastomeric tires 58, 60, which are position outwardly of the side boundaries of main frame 12, support stand frame 14 and wheel supporting frame 16, so that such tires 58, 60 can function as "bumpers" in the event the carrier makes contact with a door jam or some other surface during movement of the carrier.

According to an aspect of the invention, the carrier comprises journal means for a plurality of spool support shafts 62, 64, 66, 68. In preferred form, the journal means comprises an upwardly opening U-shaped saddle 70 on each side of the main frame 12, one for each end of the particular support shaft 62, 64, 66 or 68 which is supported thereby.

Each saddle comprises a pair of upstanding side arms 72, 74, and an interconnecting bight 75. In preferred form, the saddle is placed inside of its angle iron side member 18, 20, with its bight 75 on a web 34, 36, and with the outer edges of its side arms 72, 74 against a web 30, 32. The saddle members 70 may be welded to the angle iron webs 30, 34 and 32, 36, as illustrated.

Each saddle 70 is formed to include a pair of aligned holes in its side arms 72, 74, to receive a lock pin 76, sometimes referred to in the trade as a "hairpin" due to its resemblance to a hairpin.

Each lock pin 76 is installed by inserting a straight leg 78 thereof through the aligned openings, with the bent leg 80 thereof positioned over the ends of side arms 72, 74. The bent nature of the leg 80 makes it necessary for the two legs 78, 80 to spring apart somewhat when the lock pin 76 is being inserted, so that inwardly curving portions of the outer leg 80 can snap over the end of leg member 74. Once a lock pin 76 is installed in the manner shown by FIG. 3, the inwardly curving portions of leg 80 are positioned laterally between arms 72,74, and serve to lock the lock pin 76 in place.

The vertical spacing between straight leg 78 of pin 76 and the bight 75 is slightly greater than the diameter of a support shaft 62, 64, 66, 68. The side arm 72, 74 are spaced apart a distance slightly larger than the diameter of a support shaft 62, 64, 66, 68.

In accordance with one aspect of the invention, the operator loads the carrier 10 in the following manner:

The lock pins 78 are installed on a saddle on one side of the carrier. Then, the operator picks up a reel or spool of wire, with a support shaft 62, 64, 66 or 68 extending through its center openings, and projecting outwardly from each end such spool. Preferably, the operator picks the reel up under one arm, with the hand of his opposite arm on the leading end portion of the support shaft 62, 64, 66, or 68. He uses such hand to guide the leading end portion of the shaft 62, 64, 66 or 68 into the saddle, beneath the lock pin 76. Then, he allows the reel and support shaft to swing downwardly until the opposite end of the support shaft is within the saddle 70 on its side of the main frame 12. Once such end portion is within such saddle 70, its lock pin 76 is inserted.

In preferred form, the carrier 10 is provided with four spools of wire, R1, R2, R3 and R4.

The journal means for the first spool is spaced towards the first end of the main frame 12 from the support wheels 54, 56, between the first end of the main frame and a connection of the wheel supporting frame 16 with the main frame 12. The second journal means for the second reel and its support shaft 64 is positioned closely adjacent the connection of the wheel supporting frame 16 with the main frame 12. The third journal means for the third reel and its support shaft is positioned between the connection of the wheel supporting frame 16 to the main frame and the second end of the main frame. The fourth journal means for the fourth reel and its support shaft is positioned generally at the second end of the main frame.

Handles 82, 84, which are preferably equipped with hand grips 86, 88 are provided at the second end of the main frame 12. As shown, such handles may be welded to the upper ends of the side members 24, 26 of the support stand frame 14. Handles 82, 84 are oriented to extend at an acute angle with respect to the general plane of the support stand frame 14.

Figure 6:
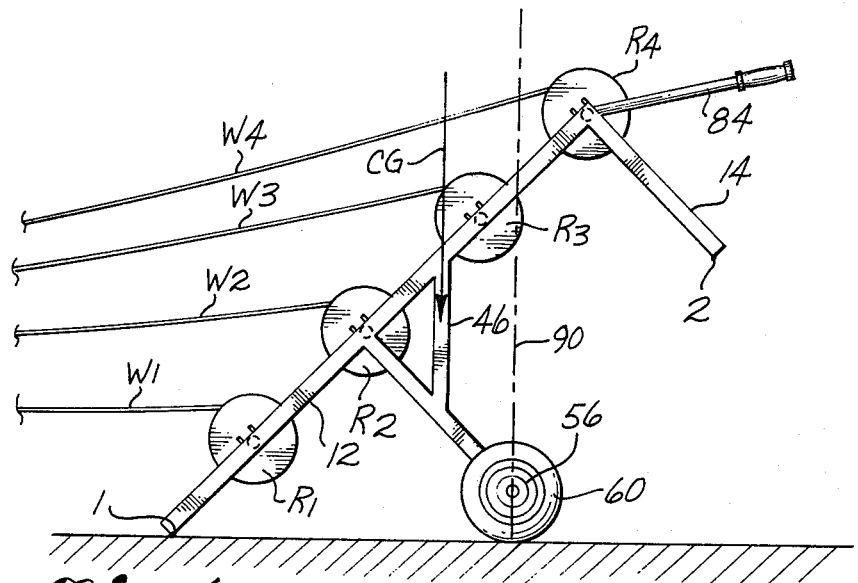
FIG. 6 is a view similar to FIG. 5, but showing the carrier oriented for dispensing wires in a generally horizontal direction.

The reels R1, R2, R3, R4 are positioned on the carrier such that the wires W1, W2, W3, W4 carried thereby each extends at a tangent from its reel from the same location on its reel. In FIG. 6, the wires W1, W2, W3, W4 are all shown to leave at a tangent from the top of the reels R1, R2, R3, R4.

According to an important aspect of the invention, the positioning of the journal means for the four spool support shafts 62, 64, 66, 68 relative to the first and second ground contacting supports 1, 2 and the wheels 54, 56 is such that when the carrier 10 is loaded with spools or reels and is in its first dispense position (FIG. 6), the center of gravity CG of the carrier and spools is spaced towards the first end of the carrier from the location of contact of the ground contacting wheel with the ground, indicated by a vertical broken line 90.

Figure 7:
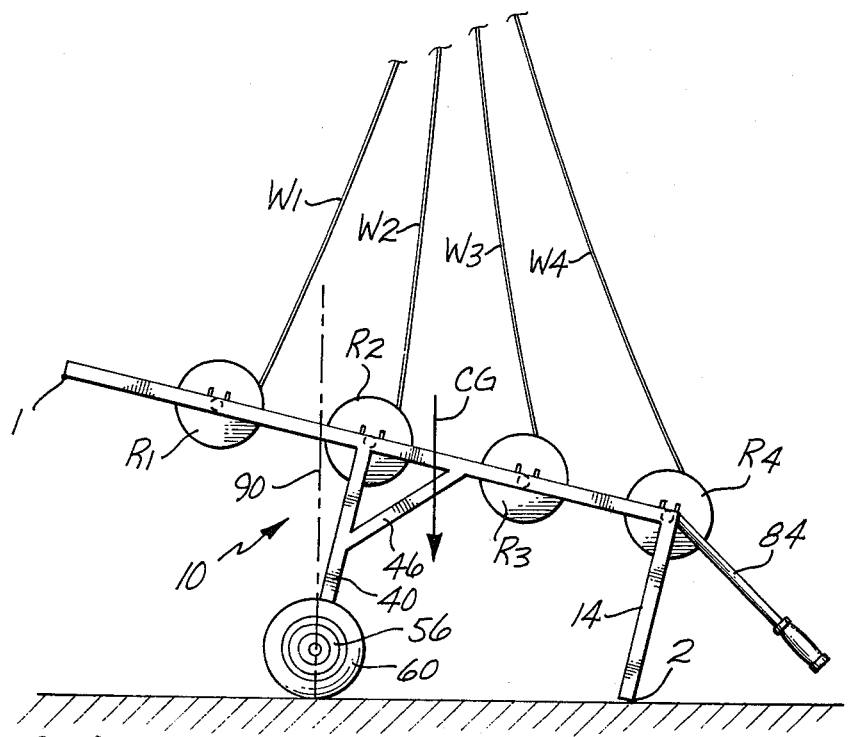
FIG. 7 is a view similar to FIGS. 5 and 6, but showing the carrier oriented for dispensing the wires in a generally vertical direction.

When the carrier is in its second dispense position (FIG. 7) the second ground contacting support 2 and the wheels 54, 56 contact the ground and the main frame slopes downwardly from its first end to its second end. Also, the center of gravity CG is positioned towards the second end of the carrier from the location of contact of the ground contacting wheel with the ground.

Figure 5:
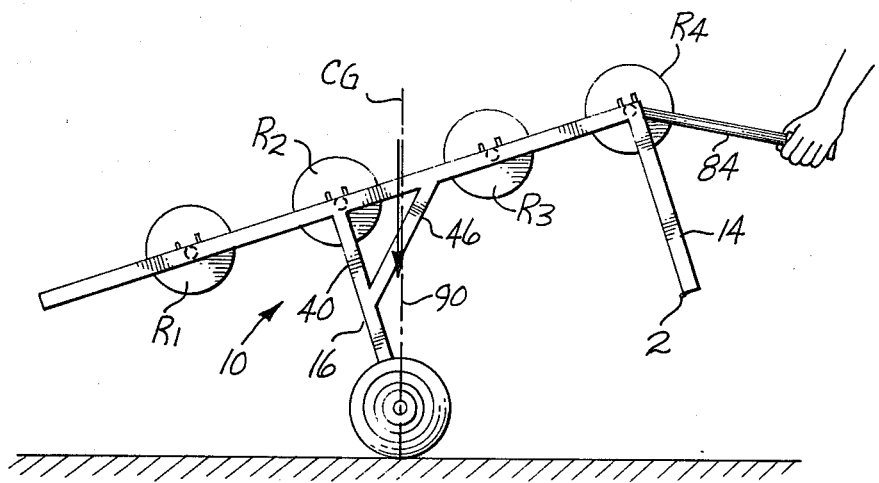
FIG. 5 is a side elevational view of the carrier, in its travel position.

The positioning of the handle means 82, 84 relative to the journal means for the spool support shafts 62, 64, 66, 68, to the wheels 54, 56, and to the first and second ground contacting supports 1, 2 is such that when an operator is standing substantially upright, with his hands positioned downwardly and slightly in front of him, and he is holding the handles 82, 84 in his hands, the loaded carrier is ground supported by the wheels alone and the center of gravity of the carrier and reels carried thereby is substantially over the wheels. The loaded carrier is substantially weight balanced on the wheels 54, 56 (FIG. 5).

By way of typical and therefore nonlimitive example, the main frame 12 may measure sixty inches in length, from the outside of cross member 22 to the opposite end of the main frame member. The distance between the outside edge of member 22 and the center of shaft 62 may be about twelve inches and the shafts 62, 64, 66, 68 may be spaced apart about sixteen inches on center. The handles may measure about twelve inches in length and may make an angle of about sixty degrees with respect to the general plane of support stand frame 14. The vertical distance between the center of rotation of the wheels and the center line of the shaft 64 may be about twenty inches. Diagonal braces 44, 46 may extend at a forty-five degree angle and the two side legs of the triangle formed thereby may measure about eight inches in length. The wheels 54, 56 may be about ten inches in diameter. The reels or spools may measure about eighteen inches in diameter at their ends. The maximum width of the carrier, measured between the outside surfaces of the tires 58, 60 may be about twenty-three and one half inches. The support stand frame may measure about thirty-six inches from its lower support surface 2 up to the center rotation of the shaft 68.

The following are some of the features and advantages of the preferred embodiment:

1. The carrier is narrow enough to fit through regular sized door openings.

2. The carrier can be easily maneuvered in tight quarters because of the central location of the wheels.

3. The outside positioning of the wheels protect against door frame damage, etc., the tires can function as bumpers or shields. They will not damage door trim or other surfaces which they contact because they are constructed from an elastomeric material.

4. The carrier is weight balanced front-to-rear. As a result, it can be easily trundled when loaded. Also, it can be easily wheeled over debris and other articles on the ground or floor.

5. The sloping attitude of the main frame when the carrier is in its first dispense position places the reels at different levels with the wire paths close enough together that a guide is not necessary in order to pull a group of the wires along a generally straight path leading into a conduit.

6. The carrier is easy to load by one man.

7. The operator can see the amount of wire which is remaining on each spool. This is in contrast to situations which exist when boxed wire is used. Sometimes workmen have paid out wire from a box only to find out that the length of wire in the box was too short. As a result, the workmen had to unload the conduit and start over again.

8. The wire can be stored on larger spools. This results in wire saving because it cuts down on the number of unusable short "ends".

9. The frame is lightweight and can be easily loaded into a truck by one man.

Although a preferred embodiment of this invention has been illustrated and described, it is to be understood that various modifications and rearrangements of elements may be made without departing from the scope of the invention as claimed below.

I claim:

1. A carrier for a plurality of spools of wire or the like, adapted to receive and support the ends of a plurality of spool support shafts which extend laterally across the carrier, through center openings in the spools, and on which the spools rotate, said carrier comprising:

a rectangular main frame having first and second ends and comprising a pair of spaced apart elongated side members, a cross member at said first end connecting the two side members together, said first end presenting a first ground contacting support;

a support stand frame at second end, connecting the two side members together at such end and extending downwardly from the main frame to function as a stand at such second end, and presenting at the its lower end a second ground contacting support;

a wheel supporting frame depending from a midportion of the main frame and including ground contacting wheels at its lower end;

handle means at the second end of the main frame;

journal means carried by the side members of the main frame, for detachably securing the ends of the spool support shafts to said side members;

wherein the journal means for at least one of the spool support shafts is spaced towards the first end of the main frame from the wheels and the journal means for at least one other of the spool support shafts is spaced from the wheels toward the second end of the main frame; and wherein said carrier has a first dispense position wherein the first ground contacting support and the wheels contact the ground and the main frame slopes upwardly from its first end to its second end, and a second dispense position in which the second ground contacting support and the wheels contact the ground and the main frame slopes downwardly from its first end to its second end.

2. A carrier according to claim 1, wherein each journal means comprises an upwardly opening U-shaped saddle supported by a side member, and a removable cross pin means attachable to the saddle to define therewith an enclosure for an end portion of a spool support shaft.

3. A carrier according to claim 2, wherein each side member of the main frame is constructed from a length of angle iron having a first web which projects generally upwardly and in spaced parallelism with the first web of the other side member, and a second web which projects laterally inwardly from the first web, in coplaner parallelism with the second web of the other side member, and wherein each saddle rests on a said second web and projects upwardly closely adjacent a said first web.

4. A carrier according to claim 1, comprising a wheel on each side of the carrier, each wheel including an elastomeric tire positioned outwardly of the side boundaries of both the wheel supporting frame and the main frame, so that the tire can function as a side bumper.

5. A carrier according to claim 1, comprising journal means for four spool support shafts, and wherein the first journal means is spaced towards the first end of the main frame from the wheels, between the first end of the main frame and a connection of the wheel supporting frame with the main frame, wherein the second journal means is positioned closely adjacent the connection of the wheel supporting frame with the main frame, wherein the third journal means is positioned towards the second end of the main frame from the wheels, between the connection of the wheel supporting frame to the main frame and the second end of the main frame, and wherein the fourth journal means is positioned generally at the second end of the main frame.

6. A carrier according to claim 1, wherein the positioning of the journal means for the spool support shafts relative to the first and second ground contacting supports and the wheels is such that when the carrier is loaded with spools and is in its first dispense position, the center of gravity of the carrier and spools is spaced towards the first end of the carrier from the location of contact of the ground contacting wheels with the ground.

7. A carrier according to claim 1, wherein the positioning of the journal means for the spool support shafts relative to the first and second ground contacting supports and the wheels is such that when the carrier is loaded with spools and is in its second dispense position, the center of gravity of the carrier and spools is spaced towards the second end of the carrier from the location of contact of the ground contacting wheels with the ground.

8. A carrier according to claim 1, wherein the positioning of the journal means for the spool support shafts and the handle means relative to the wheels is such that when a typical operator has the handles in his hands, and is standing substantially upright with his hands positioned downwardly and slightly in front of him, the carrier is ground supported by the wheels alone and the center of gravity of the carrier and spools carried thereby is substantially over the wheels and the loaded carrier is substantially weight balanced on the wheels.

9. A carrier for a plurality of spools of wire or the like, adapted to receive and support the ends of a plurality of spool support shafts which extend laterally across the carrier, through center openings in the spools, and on which the spools rotate, said carrier comprising:
  main frame means having first and second ends, said first end presenting a first ground contacting support;
  a support stand frame at the second end, extending downwardly from the main frame means to function as a stand at such second end and presenting at its lower end a second ground contacting support;
  a wheel supporting frame depending from a midportion of the main frame means and including ground contacting wheels at its lower end;
  handle means at the second end of the main frame means;
  journal means on the main frame means, for detachably securing the ends of the spool support shafts to said main frame means;
  said carrier having a first dispense position wherein the first ground contacting support and the wheels contact the ground and the main frame means slopes upwardly from its first end to its second end, and a second dispense position in which the second ground contacting support and the wheels contact the ground and the main frame means slopes downwardly from its first end to its second end;
  wherein the positioning of said journal means relative to said ground contacting supports and the wheels is such that, when the carrier is loaded with spools and is in its first dispense position, the center of gravity of the carrier and spools is spaced towards the first end of the carrier from the location of contact of the wheels with the ground, and when the carrier is loaded with spools and is in its second dispense position, said center of gravity is spaced towards the second end of the carrier from said location of contact; and
  wherein the positioning of the handle means relative to said journal means, to the wheels, and to said ground contacting supports is such that, when a typical operator has the handles in his hands and is standing substantially upright with his hands positioned downwardly and slightly in front of him, the carrier is ground supported by the wheels alone and said center of gravity is substantially over the wheels and the loaded carrier is substantially weight balanced on the wheels.

10. A carrier according to claim 9, wherein each said journal means comprises a pair of spaced apart, upwardly opening U-shaped saddles, one at each side of the main frame means, and a removable cross pin means attachable to each saddle to define therewith an enclosure for an end portion of a spool support shaft.

11. A carrier according to claim 10, wherein said main frame comprises a pair of elongated side members, each of which is constructed from a length of angle iron and includes a first web which projects generally upwardly and in spaced parallelism with the first web of the other side member, and a second web which projects laterally inwardly from the first web, in coplaner parallelism with the second web of the other side member, and wherein each saddle rests on a second web and projects upwardly closely adjacent a said first web.

12. A carrier according to claim 9, comprising two wheels, one on each side of the carrier, and each includes an elastomeric tire positioned outwardly of the side boundaries of both the wheel supporting frame and the main frame means, so that the tires can function as a side bumper.

13. A carrier according to claim 9, comprising journal means for four spool support shafts, and wherein the first journal means is spaced towards the first end of the main frame means from the wheels, between the first end of the main frame means and the connection of the wheel supporting frame with the main frame means, wherein the second journal means is positioned closely adjacent the connection of the wheel supporting frame with the main frame means, wherein the third journal means is positioned towards the second end of the main frame means from the wheels, between the connection of the wheel supporting frame to the main frame means and the second end of the main frame means, and wherein the fourth journal means is positioned generally at the second end of the main frame means.

14. A carrier according to claim 13, wherein each said journal means comprises a pair of spaced apart, upwardly opening U-shaped saddles, one at each side of the main frame means, and a removable cross pin means attachable to each saddle to define therewith an enclosure for an end portion of a spool support shaft.

* * * * *

UNITED STATES PATENT AND TRADEMARK OFFICE
CERTIFICATE OF CORRECTION

PATENT NO. : 4,391,422
DATED : July 5, 1983
INVENTOR(S) : Colin McDonald

It is certified that error appears in the above-identified patent and that said Letters Patent are hereby corrected as shown below:

Column 5, line 56, "78" should be --76--.

Claim 1, column 8, line 1, --the-- should follow "at".

Claim 1, column 8, line 4, "the" should be deleted.

Claim 11, column 10, line 21, --means-- should follow "frame".

Signed and Sealed this

Twenty-second Day of November 1983

[SEAL]

Attest:

GERALD J. MOSSINGHOFF

Attesting Officer  Commissioner of Patents and Trademarks